Figure 3:
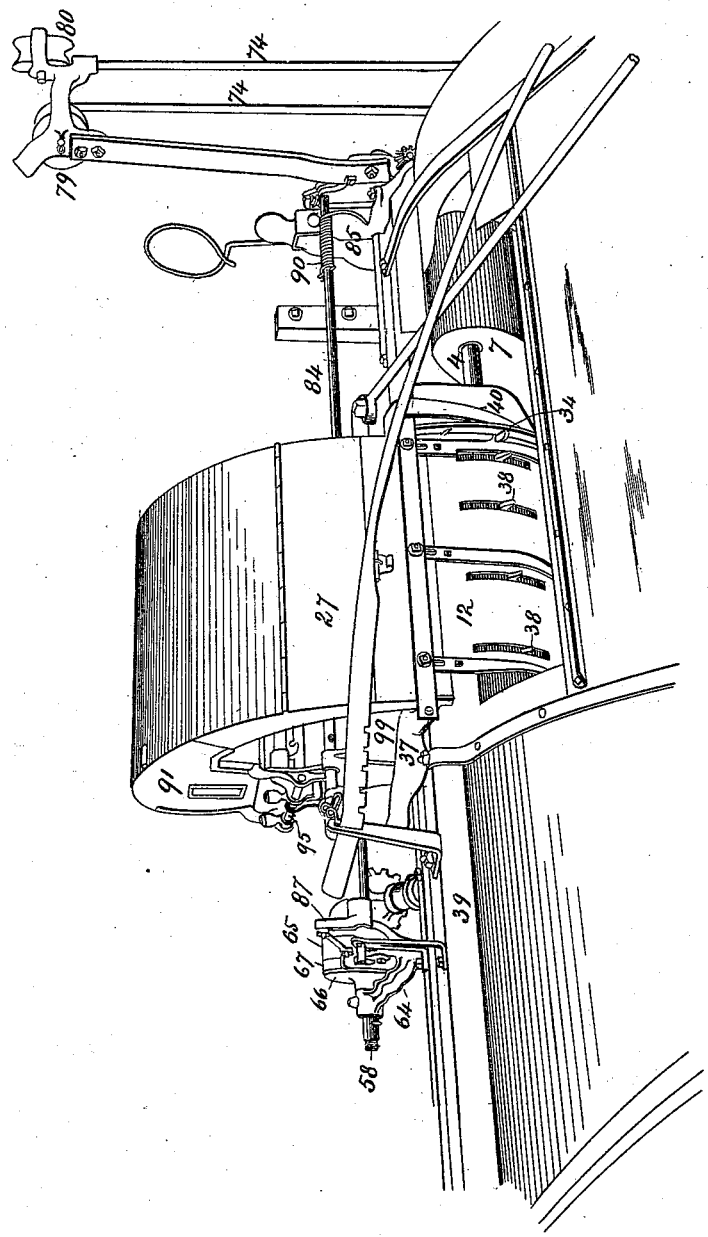

(No Model.)  12 Sheets—Sheet 1.
H. TUTTLE.
MEANS FOR MAKING STRAW BANDS FOR GRAIN BINDERS.
No. 547,700. Patented Oct. 8, 1895.
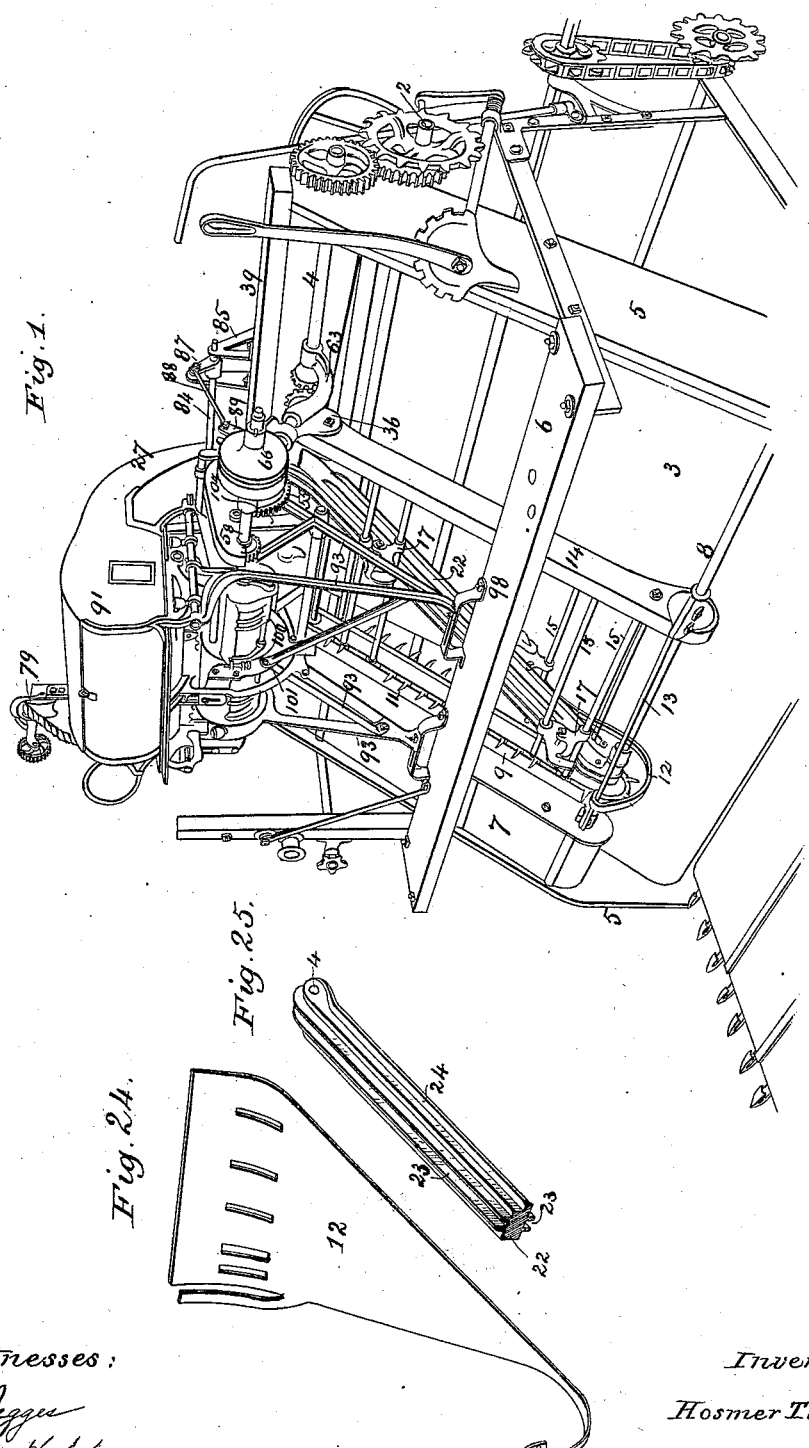
Witnesses:
A.B.Deggu
R.A.Hoffur.
Inventor:
Hosmer Tuttle,
by E.E. Masson
atty.

(No Model.)
12 Sheets—Sheet 2.
H. TUTTLE.
MEANS FOR MAKING STRAW BANDS FOR GRAIN BINDERS.
No. 547,700.  Patented Oct. 8, 1895.
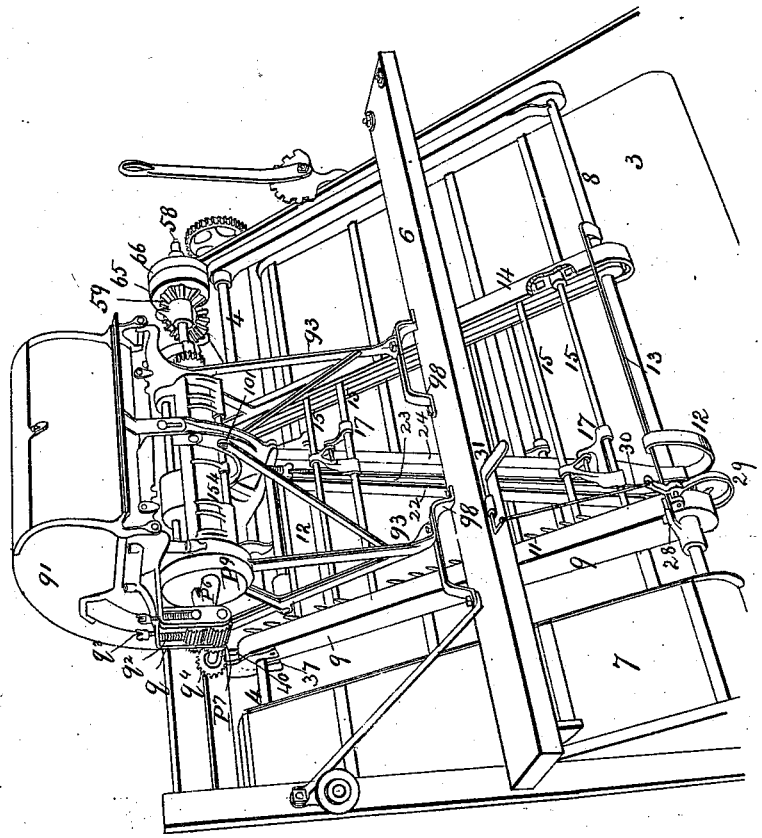
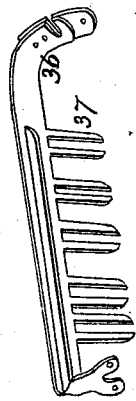
Witnesses:
A.B. Degger
R. A. Hopper.
Inventor:
Hosmer Tuttle,
by E. E. Masson
atty.

(No Model.)  
12 Sheets—Sheet 3.

H. TUTTLE.
MEANS FOR MAKING STRAW BANDS FOR GRAIN BINDERS.

No. 547,700.  
Patented Oct. 8, 1895.

Witnesses:  
A. B. Deggis  
R. A. Hopper

Inventor:  
Hosmer Tuttle  
by E.E. Masson  
atty.

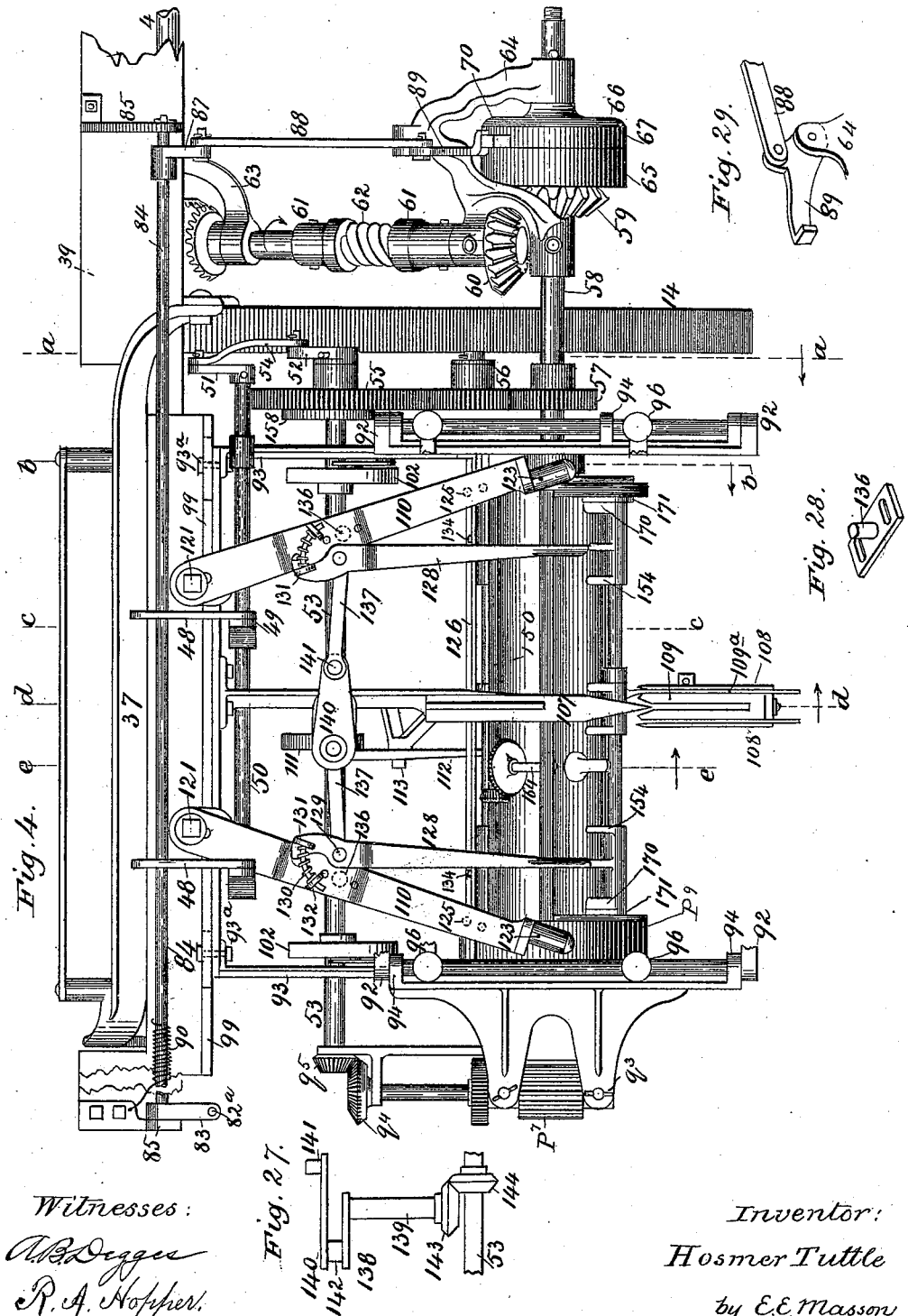

(No Model.) 12 Sheets—Sheet 5.
H. TUTTLE.
MEANS FOR MAKING STRAW BANDS FOR GRAIN BINDERS.
No. 547,700. Patented Oct. 8, 1895.
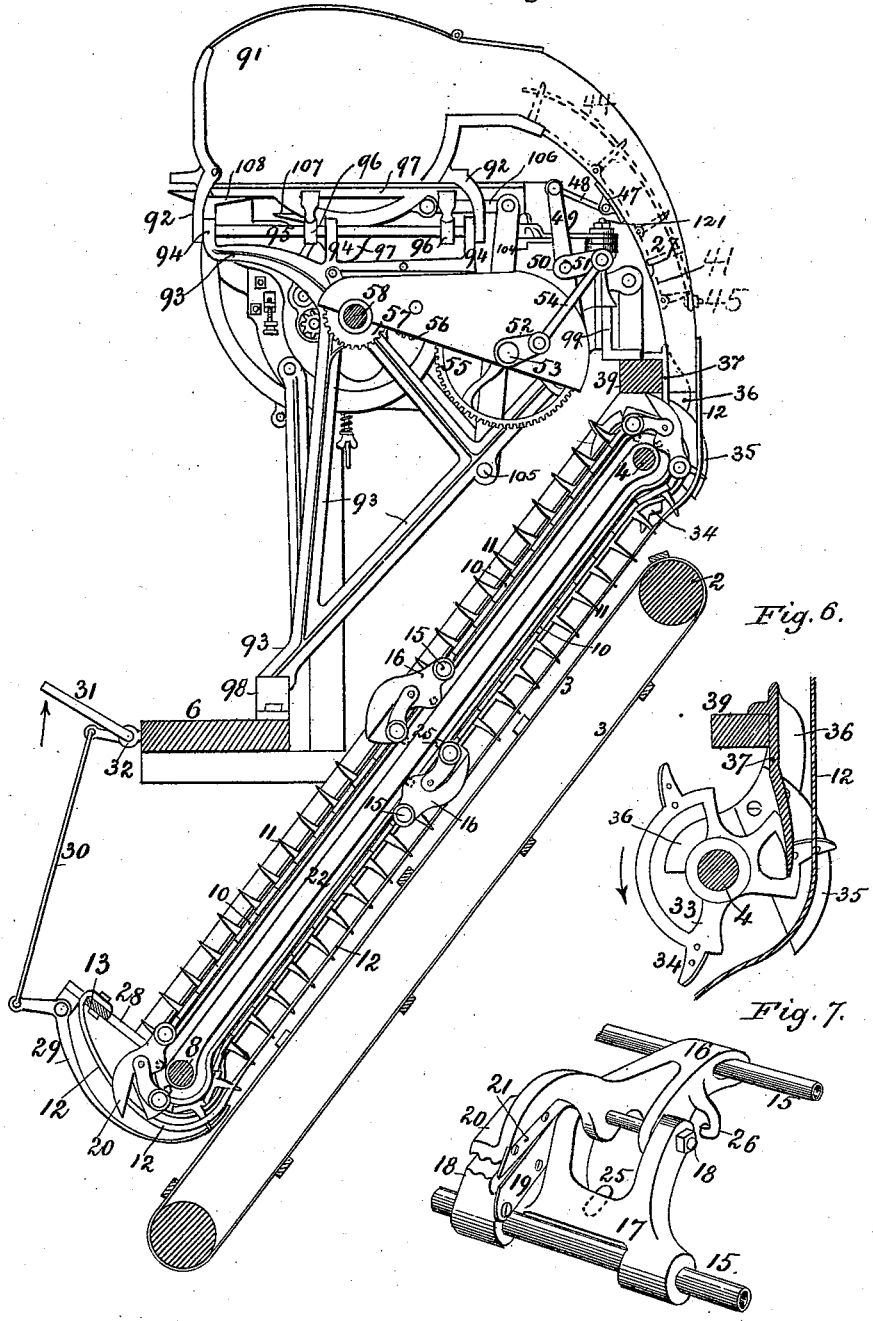
Witnesses:
A. B. Deggen
R. A. Hopper
Inventor
Hosmer Tuttle
by E. E. Masson
atty.

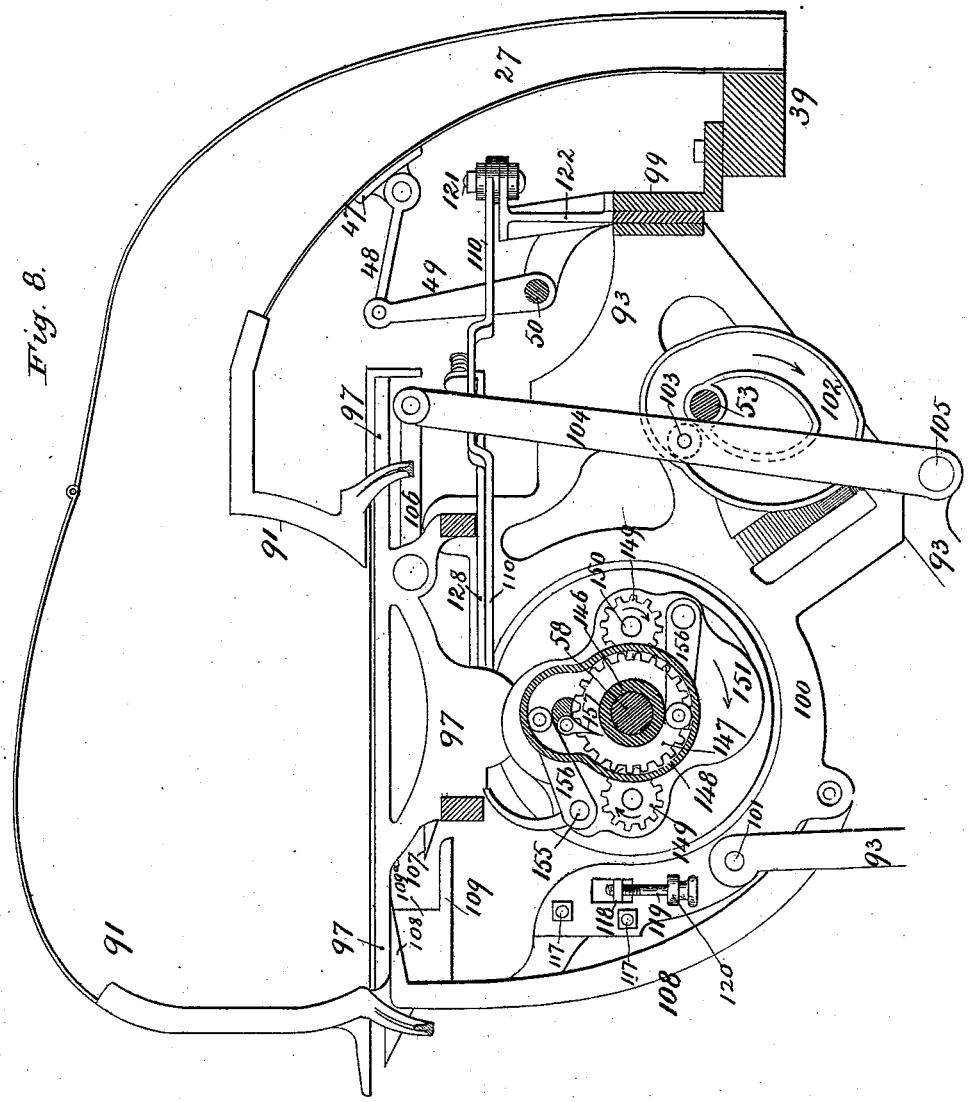

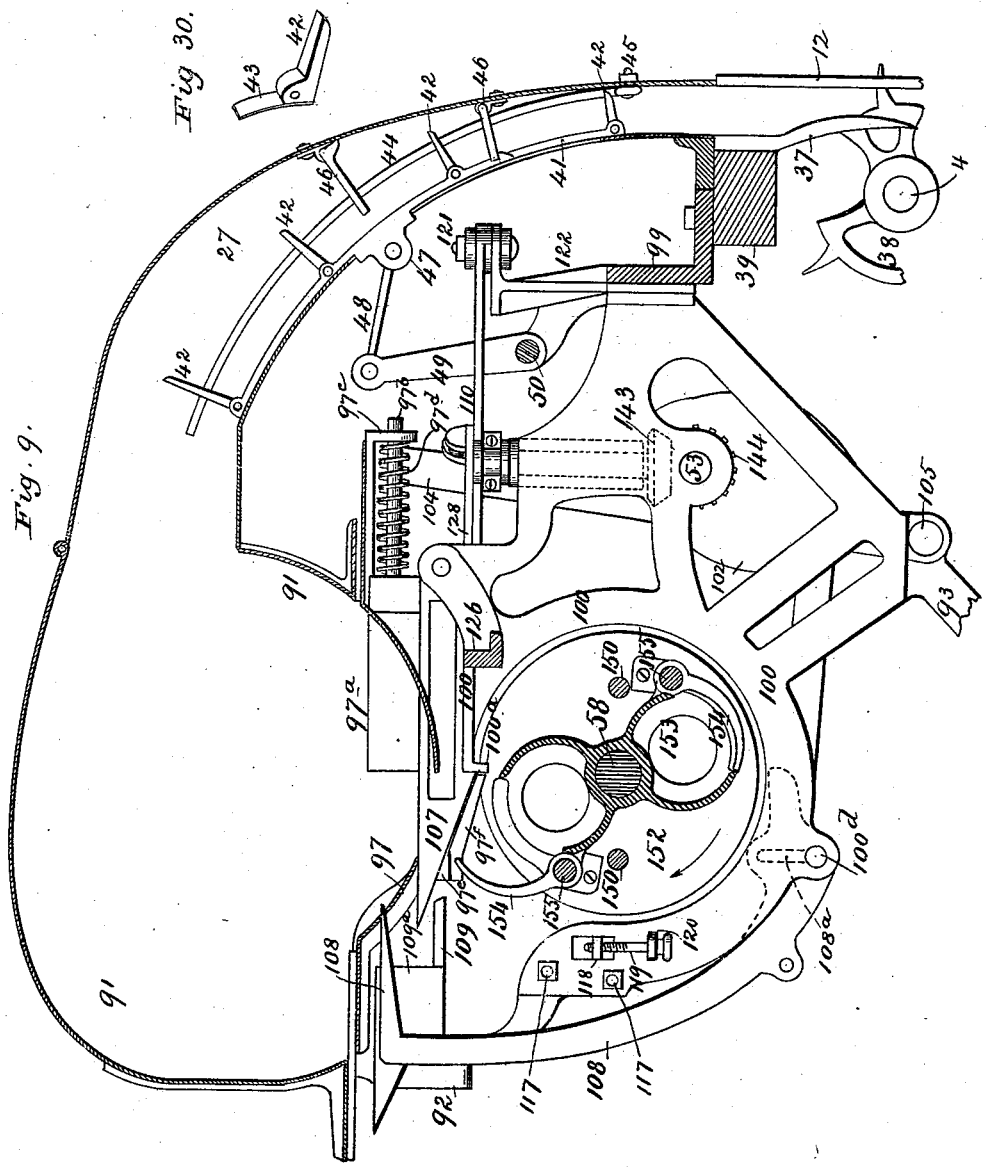

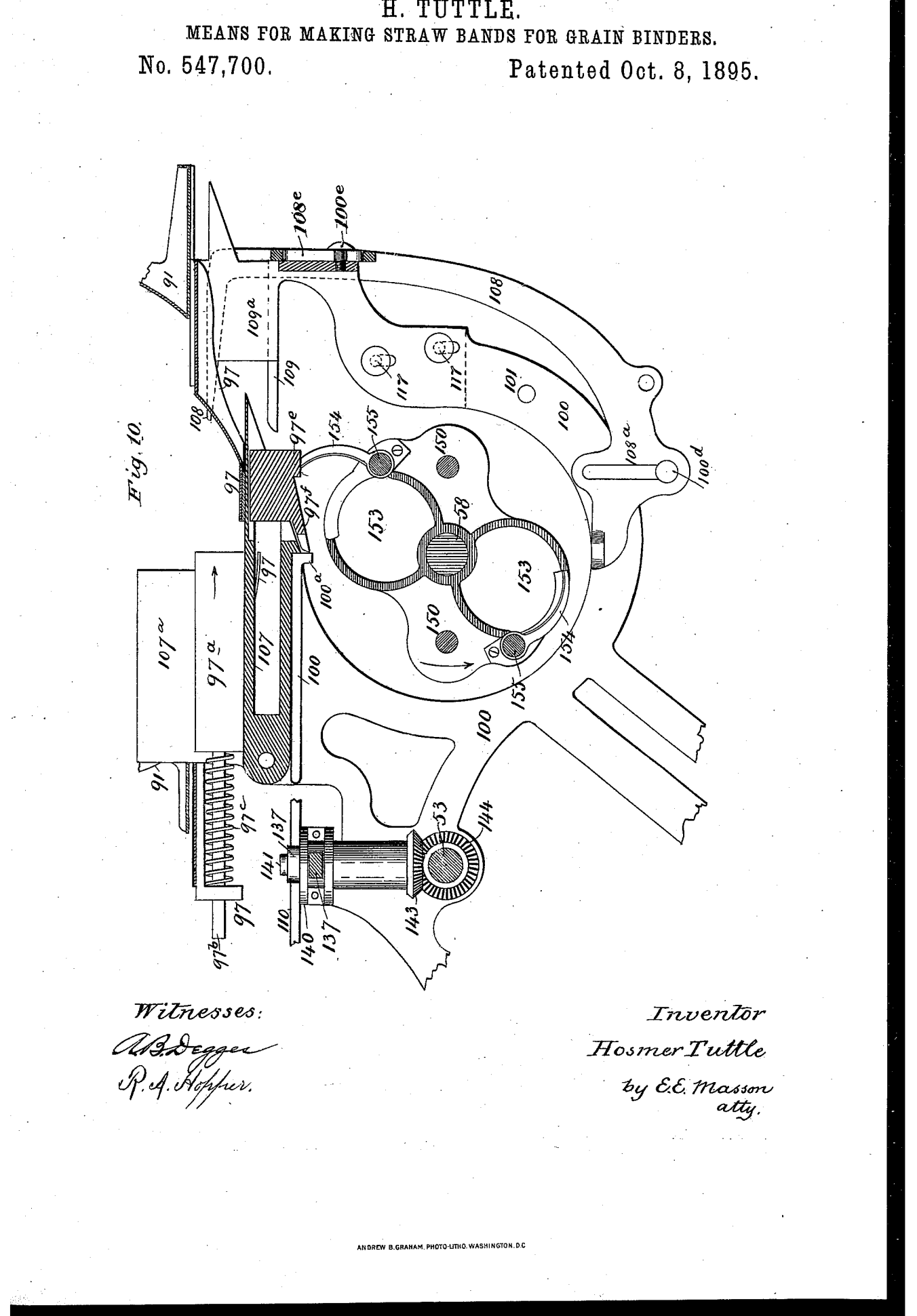

(No Model.)

H. TUTTLE.
MEANS FOR MAKING STRAW BANDS FOR GRAIN BINDERS.

No. 547,700.

12 Sheets—Sheet 8.

Patented Oct. 8, 1895.

Fig. 10.

Witnesses:
A. B. Degger
R. A. Hoffner.

Inventor
Hosmer Tuttle
by E. E. Masson
atty.

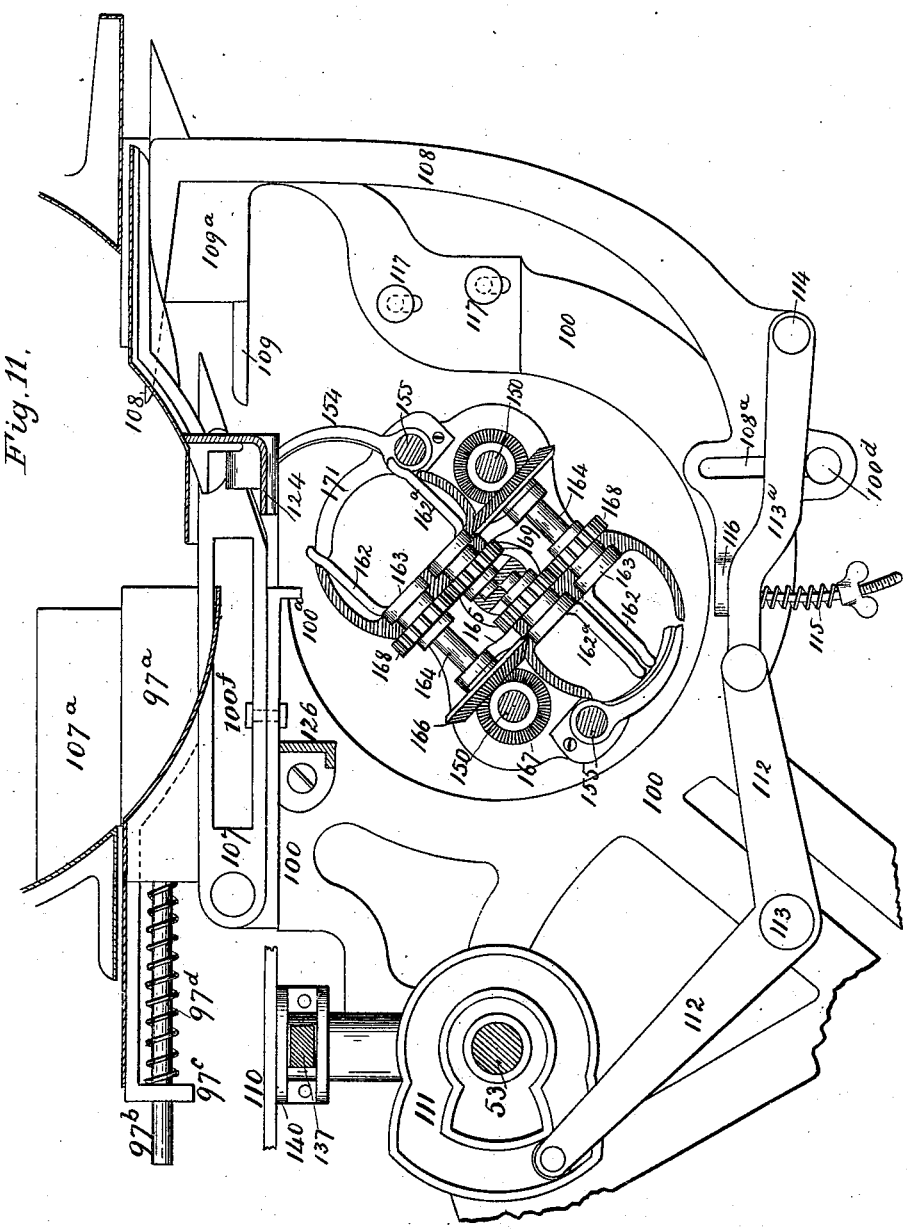

(No Model.) 12 Sheets—Sheet 10.
H. TUTTLE.
MEANS FOR MAKING STRAW BANDS FOR GRAIN BINDERS.
No. 547,700. Patented Oct. 8, 1895.
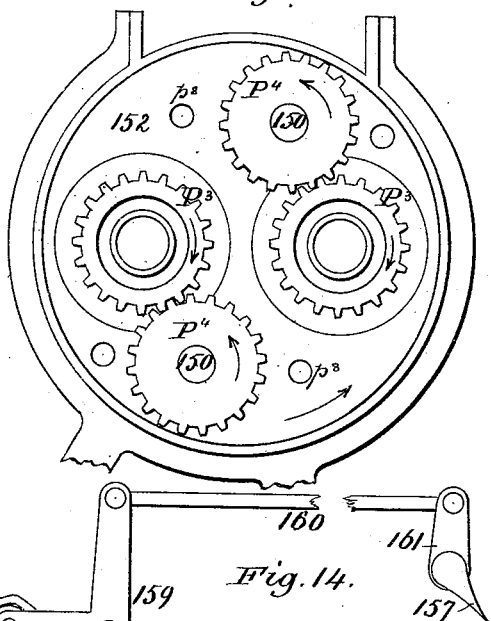
Fig. 13.
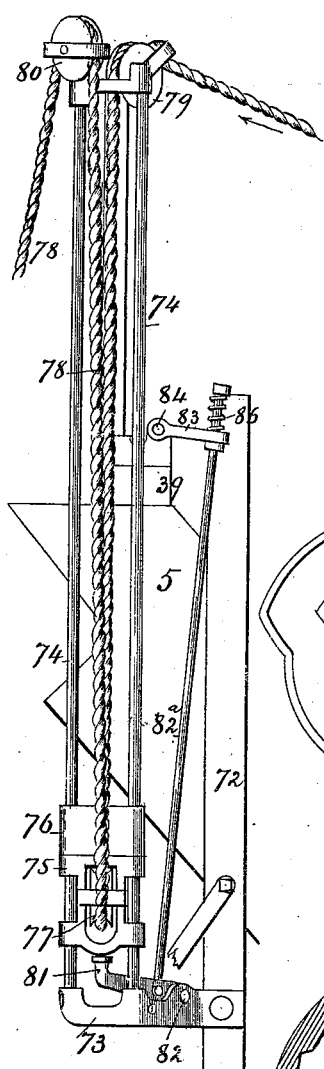
Fig. 12.
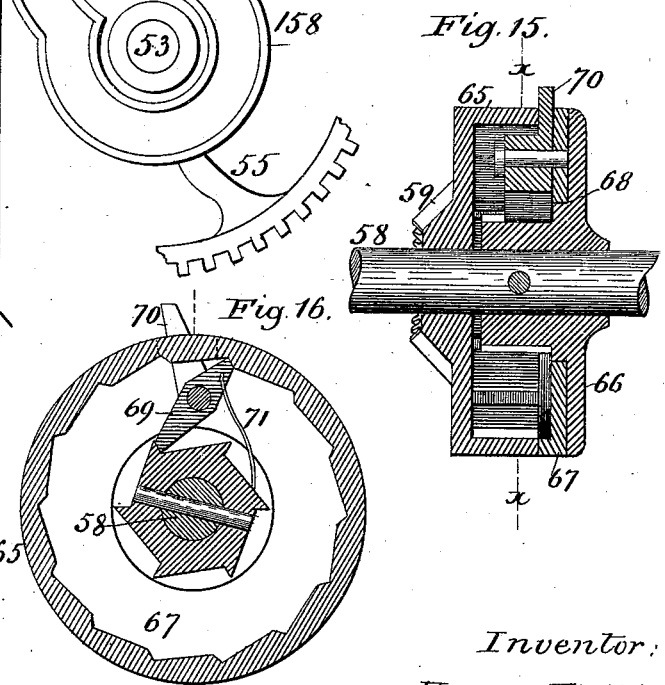
Fig. 14.
Fig. 15.
Fig. 16.
Witnesses:
A. B. Deggu
R. A. Hoffur
Inventor:
Hosmer Tuttle,
by E. E. Masson
atty.

(No Model.)  12 Sheets—Sheet 11.
H. TUTTLE.
MEANS FOR MAKING STRAW BANDS FOR GRAIN BINDERS.
No. 547,700. Patented Oct. 8, 1895.
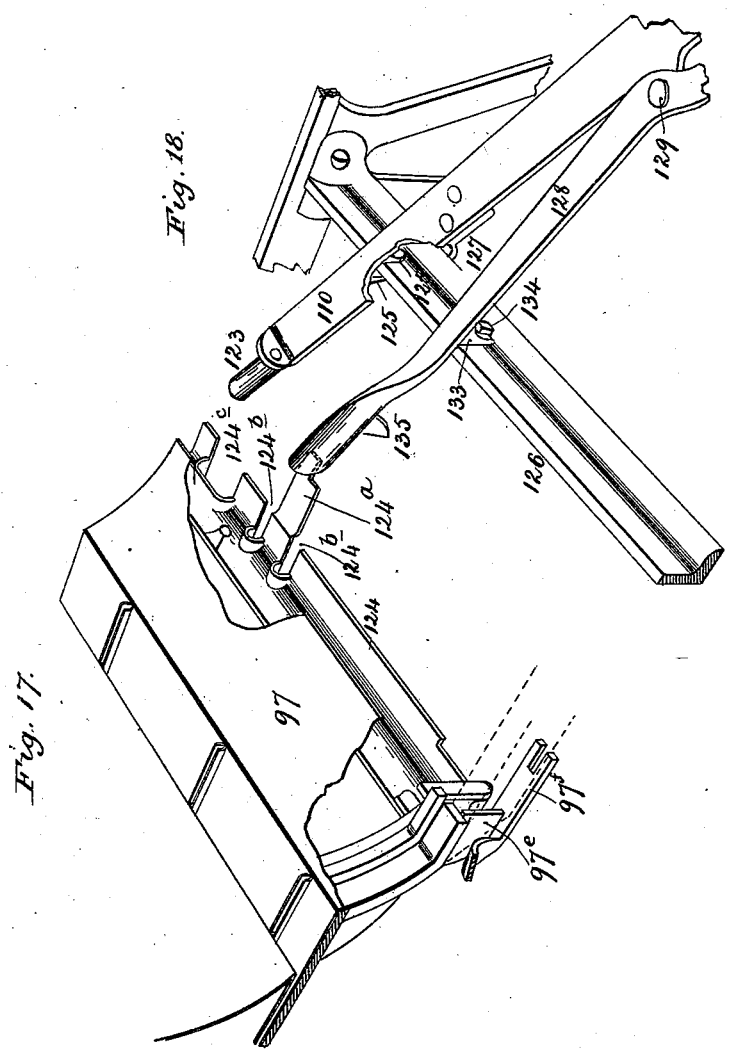

(No Model.) 12 Sheets—Sheet 12.
H. TUTTLE.
MEANS FOR MAKING STRAW BANDS FOR GRAIN BINDERS.
No. 547,700. Patented Oct. 8, 1895.
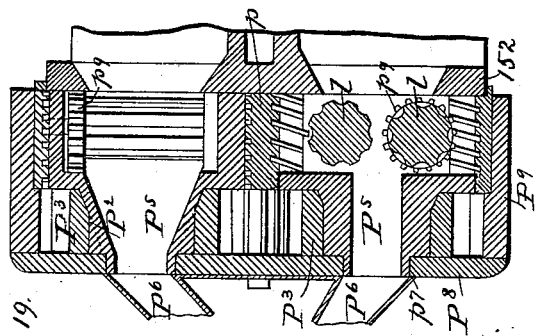
Fig. 19.
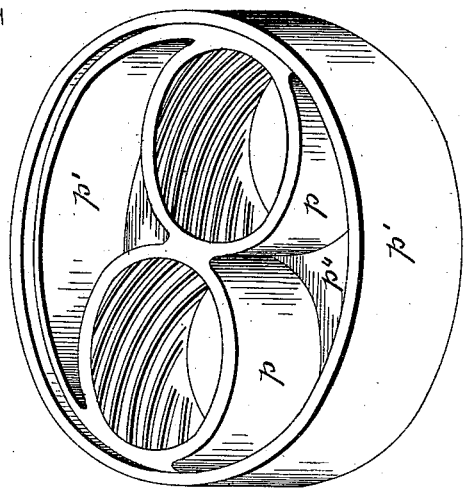
Fig. 22.
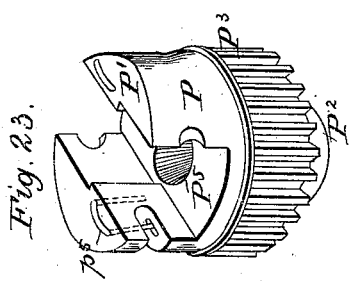
Fig. 23.
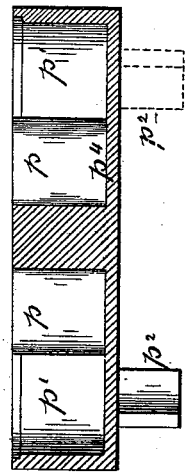
Fig. 21.
Fig. 20.
Witnesses:
A. B. Degges
R. A. Hoffur.
Inventor:
Hosmer Tuttle,
by E. E. Masson
atty.

UNITED STATES PATENT OFFICE.

HOSMER TUTTLE, OF CEDAR RAPIDS, IOWA.

MEANS FOR MAKING STRAW BANDS FOR GRAIN-BINDERS.

SPECIFICATION forming part of Letters Patent No. 547,700, dated October 8, 1895.

Application filed June 3, 1892. Serial No. 435,464. (No model.)

*To all whom it may concern:*

Be it known that I, HOSMER TUTTLE, a citizen of the United States, residing at Cedar Rapids, in the county of Linn, State of Iowa, have invented certain new and useful Improvements in Means for Making Straw Bands for Grain-Binders, of which the following is a specification, reference being had therein to the accompanying drawings.

This invention relates to apparatus for feeding the hopper and the straw-band making mechanism of a harvester from the flow of grain after it is cut and while it passes up the elevator of said harvester to the band-making and band-tying mechanism; and the objects of my improvement are to provide a simple mechanism for adjustably controlling the amount of grain taken from the flow, grasping said amount, cutting off one end of the grasped portion, straightening, combing, and cleaning the same while being elevated and led into the hopper, cutting the opposite end of the straw to make it of uniform length, and oscillating the bottom of said hopper to uniformly feed the cut straw into the band-twisting mechanism. I attain these objects by the construction illustrated in the accompanying drawings, in which—

Figure 1 is a perspective view taken from the rear side and looking upon the elevating-aprons and upon the band feeding and twisting mechanism constructed in accordance with my invention. Fig. 2 is a perspective view of a portion of the same, taken from the front side of the machine. Fig. 3 is a perspective view of a portion of the machine, showing part of the sheet-metal shield over the binder-deck, with a portion thereof removed to exhibit the upper end of the straw-elevating mechanism, and on top thereof the curved throat to lead the straw-band material to the hopper of the band-twisting mechanism, and on the right-hand side thereof the band-controlling mechanism. Fig. 4 is a top view of the band-twisting mechanism with the hopper and the gear shields removed. Fig. 5 is a vertical section on line $a\,a$ of Fig. 4, showing also the elevating-apron of the machine. Fig. 6 is a transverse section through the upper shaft of the upper apron, showing the rotary cutter used to give the second cut to the straw-band material, the stationary blade, and the throat-plates above it. Fig. 7 is a perspective view showing one of the straw pickers and cutters carried by the endless carrier, but removed therefrom. Fig. 8 is a vertical section on line $b\,b$ of Fig. 4 with the hopper-frame in side view. Fig. 9 is a vertical section on line $c\,c$ of Fig. 4, through the hopper-frame, the hopper, the hopper feed-carrier, and the band-twisting cylinder under the hopper. Fig. 10 is a vertical section on line $d\,d$ of Fig. 4, looking in the direction of the arrow thereon and showing the band-twisting cylinder and the stationary needle above it. Fig. 11 is a vertical section on line $e\,e$ of Fig. 4, looking in the direction of the arrow thereon and showing the twisting-cylinder and the movable bottom of the hopper above it and also the mechanism for grasping the straw and pushing it endwise. Fig. 12 is a front view of the band-controlling mechanism. Fig. 13 is a front view of the twisting-cylinder head with the cap removed. Fig. 14 is a front view of the cam and levers used to operate the finger controlling the admission of the straw into the twisting-cylinder shown in Fig. 8. Fig. 15 is a longitudinal section of a clutch mechanism placed upon the rear end of the band-twisting cylinder-shaft to automatically stop the production of the straw band when a sufficient quantity is made ahead for the binding mechanism. Fig. 16 is a transverse section of the clutch mechanism on line $x\,x$ of Fig. 15. Fig. 17 is a perspective view of a portion (one-half of one side) of the movable bottom of the hopper used above the twisting-cylinder. Fig. 18 is a perspective view of the inner portion of one pair of straw-dividers used in connection with the movable bottom of the hopper, represented in Fig. 17, but shown moved laterally therefrom, to continue laterally the separation made by the needle of the straw necessary to form one strand of the straw-band. Fig. 19 is a longitudinal section, on a large scale, of the front portion or head of the band-twisting cylinder. Fig. 20 is a rear view of the sleeve in which are placed the slotted cylindrical frames carrying the band-twisting rollers. Fig. 21 is a transverse section of the sleeve on line $u\,u$ of Fig. 20. Fig. 22 is a perspective view of the sleeve. Fig. 23 is a perspective view of one of the slotted cylindrical frames used to carry the twisting-rollers. Fig. 24 is a perspective view of a triangular plate used to maintain the butts of the cut grain separated while being elevated. Fig. 25 is a perspective view of the upper portion of the grooved way to guide the straw-pickers. Fig. 26 is a perspective view of the packers separating-plate. Fig. 27 is a side view of the double crank used to operate the straw-separating fingers. Fig. 28 is a perspective view, upside down, of the adjustable pivot-pin of the separating-fingers. Fig. 29 is a perspective view of the clutch-operating lever. Fig. 30 is a perspective view of one of the spring-fingers of the hopper straw-carriage.

The straw-binding mechanism is shown applied to an "Osborne" steel-frame harvester, but may be applied to harvesters of any suitable make. The primary motive power will therefore not require any specific description below the upper shaft of the bottom elevating-apron.

In the accompanying drawings, the numeral 2 indicates the driving-shaft of the lower apron 3, and 4 the driving-shaft of the upper apron, which is also the main drive-shaft of the straw-band-making mechanism. Said shafts are carried in suitable bearings attached to the elevator-frame 5, the latter supporting, also, the seat-plank 6. The ordinary upper apron extending the width of the elevator is dispensed with, and in place thereof a narrow upper apron 7 is used on the front portion or butt-end of the elevator, the lower portion of said apron 7 being carried by a roller mounted upon the shaft 8. A few inches in the rear of the narrow apron 7 there is a casing 9, that forms also a brace between the shafts 4 and 8, and a guide for a chain 10, having teeth 11 attached to the rear edge of each link. The casing 9 has a closed front; but the rear portion has an upper and a lower groove for the passage of the teeth-carrying chain. The lower groove has its ends concentric with the shafts 4 and 8; but it is bent up between said ends, as shown in Fig. 5, to permit the straw-pickers to pass over the rear edge of a triangular yielding plate 12, retained parallel with the lower apron 3. The lower portion of the plate 12 has its lower end curved concentrically with the shaft 8, but is curved, also, eccentrically thereto above said shaft and has its end secured to a horizontal stationary rod 13 above the shaft 8. About eighteen inches in the rear of the casing-brace 9 there is a similarly-grooved casing-brace 14 to guide a chain similar to the chain 10, but unprovided with teeth, as 11. A series of the links of the chain have a lug on the side thereof, upon which are mounted the tubular rods 15, that serve as guides for the straw-pickers to slide thereon. Each straw-picker, Fig. 7, consists of two members 16 and 17, hinged together upon a short bolt 18, the member 16 having an eye at its outer end fitting loosely upon one of the guide-rods 15, while the member 17 has two eyes fitting loosely upon the other guide-rod 15. On the front side of the member 17 there is a corrugated jaw 18 to grasp the straw and a blade 19 to cut it on the inner side of said jaw. The member 16 is provided with an arched arm bent, also, laterally, on the front side of which there is a corrugated jaw 20 to interlock with the jaw 18 and carrying a similar blade 21 to operate with the blade 19.

To cause each straw-picker to travel diagonally over the lower apron 3, there is placed slightly above the rear edge of the triangular plate 12 a grooved bar 22, that is provided with a grooved way 23 centrally of the top and bottom thereof and extending lengthwise thereof, and also a groove or shelf 24 in its rear edge. The grooved way 23 is to receive and guide a pin or lug 25, projecting from the inner face of the member 17 of each straw-picker and cause said picker to draw the wisp of straw that it has seized through the teeth 11 of the chain 10 to comb it while said picker ascends to the top of the apron 3. To cause the jaws 18 and 20 to be firmly closed while carrying the wisp of straw laterally and upwardly, the member 16 of the jaw 20 is provided with a hooked finger 26 to travel upon and be in engagement with the groove or shelf 24 of the diagonally-set grooved bar 22. Said finger 26, in connection with the shelf 24, is to retain the jaws positively closed and not to rely on the tension of the chain alone for that purpose. The picker-jaws become open to seize the straw when the pickers reach the lower end of the guideway at the time that they pass around the lower shaft 8, the rods 15 assuming at that point a position closer to each other. A similar movement takes place when the pickers reach the top of the grooved bar 22, which causes the jaws of said pickers to become open when they pass around the upper shaft 4 and release the wisp of straw, which is then carried up the throat 27 of the hopper. The flow of the cut grain received upon the horizontal apron of the harvester is brought in front of the elevating-apron, as usual, and is thus normally brought within reach of the straw-pickers; but when the operator sees that the machine has too much straw in advance of its need, and that the hopper is becoming too full, he can prevent the flow of cut grain from passing within reach of the pickers at the foot of the grooved guide-bar 22. For this purpose there is pivoted to the standing lug 28, that supports the front end of the horizontal rod 13, a bell-crank lever 29, Fig. 5, that has its lower arm curved in front of the path of the pickers. The upper arm of the lever 29 is united by means of a connecting-rod 30 with a pedal-lever 31, that is pivoted at 32 to the seat-plank 6. Said pedal-lever can be temporarily lifted to the position shown in Fig. 5 by the operator placing the top of his foot under it, in which position the pickers cannot grasp any straw; but when the operator removes his foot from under the pedal the weight of the latter and its connecting-rod, as well as the pressure of the flow of the cut grain along the surface of the elevating-apron, will force and push the lower arm of the lever 29 toward the shaft 8 and permit the pickers to grasp a wisp of the flowing grain and cut off about fifteen inches of the butt-end thereof and carry said length of straw diagonally up the elevator.

When the grasped wisp of straw has been elevated upon the triangular yielding plate 12 to a point directly under and close to the shaft 4, the butt-end of the wisp comes into the path of a revolving cutter 33, that is mounted upon the shaft 4. Said cutter carries a series of radial blades 34, that come successively against the side of a stationary blade 35, and cut off the uneven ends of the straw at the butt-end of the wisp to insure a uniform length for all the straws conducted into the hopper. The stationary blade 35 is secured to the inner side of a bracket 36, Fig. 6, forming a part of a comb-like plate 37, between the teeth of which the revolving packers 38, Fig. 9, pass. Said packers are similar in form to the cutter 33, but have radial fingers only in place of the radial blades 34. The plate 37 is secured to the ridge-board 39 of the harvester, and has its bracket ends 36 resting against the top of the shaft 4, giving rigidity to the latter. Said brackets also retain the upper ends of the casing-braces 9 and 14 at a proper distance apart. To prevent the teeth of the chain 10, on their downward return from carrying the butt-ends of the wisps of straw beyond the throat 27 of the hopper, a chain-stripper 40, Fig. 3, has its lower end fastened to the bottom of the casing-brace 9 alongside of the chain 10. To elevate the straw that has been properly cut into the hopper of the band-twisting mechanism through the curved throat 27 of said hopper, there is placed in said throat a reciprocating elevator, which consists of two curved carriers 41, placed parallel to each other, and a few inches apart, one of which is shown in Fig. 9. Said carriers have a series of fingers 42 pivoted thereto, that normally occupy a position at right angles to the periphery of the outer face of the carrier while elevating the straw, but become partly folded upward while descending into the straw to take a new load. A light flat spring 43 is preferably attached to the back of each finger 42 to quickly return it to its straw-elevating position. To retain the straw in close contact with the carriers, spring-wires 44 are attached at 45 to the inside surface of the throat and are made to extend alongside of the fingers 42. To prevent a retrograde movement of the straw, fingers 46 are pivoted to the inside of the throat opposite the carriers, but the hinge end of said fingers is pivoted with a heel to prevent their free end from dropping into a position lower than radial to the carrier.

To reciprocate the carriers, each one is provided with a perforated lug 47, that passes through a slot in the under side of the throat 27. To each lug 47 is pivoted a connecting-rod 48, having its opposite end pivoted to one end of a crank-arm 49. The lower end of each crank-arm is secured to a rock-shaft 50. Said shaft 50 carries at one end thereof a crank 51, that is united to a crank 52 on a counter-shaft 53 by means of a connecting-rod 54. This shaft 53 carries also a gear-wheel 55, that meshes with a counter-pinion 56, and the latter meshes with a pinion 57 upon the shaft 58 of the band-twisting cylinder. To rotate the shaft 58 there is loosely mounted thereon a bevel-pinion 59, that meshes with a bevel-pinion 60, which is mounted on a short counter-shaft 61. Said shaft consists of two parts united by a torsional spring 62, to cushion the shock produced by coupling said constantly-moving shaft 61 to the temporarily stationary-shaft 58. The lower end of the shaft 61 is supported by a bracket 63, Figs. 1 and 4, having perforated lugs through which the shaft 4 passes, while the upper end of the shaft 61 is supported by a bracket 64, having perforated lugs through which the shaft 58 passes. The clutch on the shaft 58 consists of a circular casing 65, provided internally with ratchet-teeth, and on one side with the bevel-pinion 59, integral therewith. On the opposite side of the casing 65 there is a disk 66, having a central boss provided with ratchet-teeth on its periphery through which the shaft 58 passes and to which said disk and its boss are secured. Between the casing 65 and the disk 66 is placed a disk 67, centrally perforated to receive a circular shoulder 68, projecting from the inner surface of the disk 66 and by which it is carried. The disk 67 carries pivoted thereto on its inner side a double-pointed pawl 69, having integral therewith a finger 70, that projects through a short slot in the periphery of the disk 67. The ends of the pawl 69 are kept in engagement with their ratchets by means of a flat spring 71, secured to said pawl and having its outer end pressing against the ratcheted boss of the disk 66.

To automatically disconnect the pawl 69 from engagement with its ratchets, and thereby stop the rotation of the shaft 58 of the band-twisting cylinder and the production of the straw-band, a band-controlling mechanism is used, which is placed in front of the elevator-frame of the harvester and secured to one of the reel-posts 72 thereof. For this purpose a bracket 73, Fig. 12, is secured to said post and carries two parallel vertical guide-rods 74 for a sliding pulley-carrier 75, having perforated ears for the passage of the guide-rod, upon which carrier a suitable weight 76 is placed. The carrier has loosely mounted thereon a pulley 77, that rests upon the straw-band 78. At the upper ends of the rods 74 are bearings for pulleys 79 and 80, to direct the straw band from the band-twisting cylinder over the pulley 79, and thence under the bottom pulley 77 and over the pulley 80 to the bundle-tying mechanism of the harvester.

When enough straw band has been made to produce a loop thereof nearly equal to the length of the guide-rods 74, the bottom of the pulley-carrier 75 presses upon the head of an angular lever 81, that is pivoted at 82 to the bracket 73, and depresses said lever, which has pivoted thereto the lower end of a vertical rod $82^a$. The upper end of the rod is connected to a crank-arm 83 with a horizontal shaft 84, retained in suitable bearings 85, secured on top of the ridge-board 39. The connection between the upper end of the rod $82^a$ and the arm 83 is preferably by means of a collar secured to said rod 82 under said arm 83, and a coiled spring 86, having its upper end bearing against the under side of a nut secured on top of the rod $82^a$, the spring 86 being to guard against the transmission of any sudden shock to the finger 70 of the pawl 69 in case the pulley-carrier 75 and its weight should suddenly fall on the head of the lever 81 by the breaking of the loop of straw band 78. The rear end of the shaft 84 carries a crank-arm 87, which is united by a connecting-rod 88 with a bell-crank lever 89, pivoted to the bracket 64. The free end of the lever 89 is bent laterally to present a broad surface to press against the finger 70 of the double-ended pawl 69 to disconnect it from its ratchet-wheels. To normally keep the free end of the lever 89 elevated from the finger 70, a spring 90, Figs. 3 and 4, is coiled upon the shaft 84 and has one end secured to said shaft and the other to the supporting-bearing 85 for said shaft. The band-straw elevated through the throat 27 of the hopper falls into said hopper, which consists of two superposed parts. The upper part 91 is stationary and is secured by means of two pendent lugs 92 at each end to a skeleton iron frame 93, having three lugs 94 at its upper end secured by means of a polished rod 95 at each end, that serves as guides for lugs 96, pendent from the reciprocating bottom 97 of the hopper. The skeleton frame 93, carrying the band-twisting cylinder, its hopper, and their operating mechanism is adapted to be moved more or less forward over the seat-board and the ridge-board, so as to be in proper position relatively to the position occupied by the butt of the grain on the elevating-apron to obtain the proper length of the straw for the band. For this purpose the feet of the iron frame 93 rest upon iron supports 98, that are secured on top of the foot-board 6, said supports being longitudinally slotted to receive bolts passing through the feet of the frame 93. The upper rear portions of the frame 93 are adjustably bolted to an angle-iron 99, secured on top of the ridge-board by bolts $93^a$, passing through slots shown in dotted lines in the vertical web of said angle-iron. The frame 93 has also two braces converging upward and having their upper ends secured by a bolt at 101 to the middle frame 100, encircling the band-twisting cylinder loosely at that point.

To reciprocate the bottom 97 of the hopper a cam 102, Fig. 8, is secured upon the counter-shaft 53 near each end thereof. The groove in each cam 102 receives a roller 103, mounted upon a stud-pin projecting from the side of a lever 104, having its lower end pivoted at 105 to the skeleton frame 93. The upper end of the lever 104 is united by means of a connecting-rod 106 with the frame of the bottom 97 of the hopper, and these parts are adapted to cause the straw in the hopper to settle in the bottom thereof on top of the stationary needle 107 and in front of the vertical web $107^a$, projecting up from the top of said needle. The needle 107 is secured to the frame 100 by a bolt $100^f$. The parts in Figs. 8, 9, and 10 are shown in a position when the bottom of the hopper is ready to be moved over the needle and toward the point thereof. When the motion takes place, the front edge of a small plate $97^a$, carried by the bottom 97 of the hopper, advances the straw toward and beyond the point of the stationary needle 107. The plate $97^a$ passes through a vertical slot in the curved sheet metal of the bottom 97 of the hopper and is provided with a tail $97^b$, passing through a rib $97^c$, supporting the sheet metal of the bottom 97 of the hopper, and a spring $97^d$ is coiled on said tail and made to bear against the rear end of the plate $97^a$ to permit it to yield if there is too large an amount of straw between its front edge and the opposite curved sheet metal of the hopper bottom. The straw advanced by the plate $97^a$ is pushed under the forked ends, Fig. 4, of an arm 108. Said ends are pointed and substantially horizontal, but the arm 108, carrying them, having a vertical slot $108^e$, receiving a guide-pin $100^e$, projecting from the frame 100, is adapted to move vertically and carry said ends in a vertical path to bring the straw forcibly upon the horizontal stationary shelf 109 that is in front, but on a lower level than the point of the stationary needle. Said shelf 109 has vertical wings $109^a$ to arrest the straw advanced by the web $97^a$. To remove the straw from the shelf 109 and force it against the beveled under side of the needle, which has its bottom vertically slotted for the passage of the lip $97^e$, the straw-guide bar 124, attached to the movable bottom 97 of the hopper, carries pendent from the bottom thereof the flat vertical lip $97^e$, having secured to its bottom edge a narrow flat plate $97^f$, set at an angle parallel with the inclined under side of the needle, between which plate and needle the straw becomes grasped to resist the frictional pull of the fingers 110, Figs. 4 and 17, that complete the straw separation begun by the needle. The end of the plate $97^f$ is slotted to straddle a flat lug $100^a$, Fig. 10, pendent from the frame 100, that prevents any of the straw clamped against the under side of the needle from being pushed out of said clamp by the fingers of the straw-twisting cylinder.

To operate the vertically-movable straw-depressing arm 108, there is a grooved cam 111, Figs. 4 and 11, secured upon the countershaft 53. Within the groove of said cam a roller is adapted to travel, and said roller is mounted upon one end of a bell-crank lever pivoted at 113 to a bracket-like portion of the middle frame 100. The opposite end of the lever 112 may be pivoted to the lower end of the arm 108; but to prevent the under side of the forked upper end of the arm 108 from packing the straw too tightly upon the shelf 109 one end of the lever 112 is pivoted to a link 113$^a$, that has its opposite end pivoted at 114 to the arm 108, while the portion of the link 113$^a$ nearest to the lever 112 is supported upon a spring 115, adjustably retained upon a screw-rod secured to a lug 116, projecting from the side of the arm 108, said lug 116 resting upon the link 113$^a$, furnishes a rigid surface for the link 113$^a$ to operate against to elevate the arm 108, while the spring 115 presents a yielding cushion for said arm 108. The lower portion of the arm 108 is pivoted and guided upon a headed pin 100$^d$, projecting from the side of the frame 100 and passing through a vertical slot 108$^a$ in said arm 108.

To regulate the feed or amount of straw capable of lodging upon the shelf 109 under the point of the needle, the arm carrying said shelf has vertical slots in its lower portion to receive the bolts 117, that secure it adjustably to the middle frame 100. The arm carrying the shelf 109 and its wings has also a lug 118 on one side, Fig. 9, that passes through a rectangular perforation in the middle frame, and a screw 119, passing through a lug 120, secured to said frame, and through the lug 118, permits the adjustment of the arm carrying the shelf 109. The fingers 110, used to continue the straw's separation begun by the needle, have one end pivoted at 121 to the top of the ribbed posts 122, that are secured to the angle-iron bar 99 on top of the ridge-board 39. The pivot-bolts 121 pass through slots in said ends of the fingers to permit the ends thereof carrying the rollers 123 to travel on a straight path upon the top of the straw-guide bar 124, Figs. 11 and 17. To cause said roller end to travel on a straight path, each finger 110 is provided on the under side thereof with two pendent lugs or pins 125 a short distance from said end. The portion of the said finger between the lugs 125 rests upon the edge of a straight angle-iron bar 126, and a hooked lug 127, that bears against the under side of said bar, prevents it from raising up. To keep the separated straw apart from the rest at two points on each side of the needle, an auxiliary dividing-arm 128 is pivoted at 129 to the side and partly on top of the finger 110. It has its outer end slightly concaved to fit snugly against the side of the roller 123, and said ends are normally kept in close contact together when they are within the slotted sides of the needle and for some distance in their travel on each side thereof by means of a spring 130, mounted upon a curved wire and having one end pressing against a lug 131, projecting up from the top of the arm 128, and the other end against a lug 132, projecting from the top of the finger 110. To cause the dividing-arm 128 to be arrested while advancing laterally from the needle, it is provided with a lug 133, pendent from its under side, that comes in contact with a lug or pin 134, Fig. 18, projecting up from the horizontal web of the angle-iron bar 126, while the lugs 125 of the finger can pass over it. The angle-bar 124 is provided with a horizontal tongue 124$^a$ to support the wisp of straw that has been separated from the straw in the hopper, and on each side of said tongue are openings 124$^b$ to permit the fingers of the twisting-cylinder to come up and take the straw. There is also a larger opening 124$^c$ for the passage of the larger fingers that cut the straw at the end of the twisting-cylinder. To prevent the separated wisp of straw from being pulled away from the top of the straw-guide bar 124 before the proper time by the fingers of the straw-twisting cylinder the dividing-arm 128 has pendent from its under side a lug 135, which abuts against the edge of the bar 124. To laterally reciprocate each finger 110 and dividing-arm 128, there is pivoted thereto on a pin 136 one end of a connecting-rod 137, that has its opposite end pivoted to one of the crank-pins of a double crank 138, Fig. 27, the vertical shaft 139 of which is received in a bearing projecting from the side of the frame 100, Fig. 10. Said crank has an upper arm 140, carrying a crank-pin 141 for one of the connecting-rods 137, while one end of the opposite rod 137 embraces the crank-pin 142, Fig. 27. The pivot-pin 136 to engage with the outer end of the connecting-rod 137 has a large flat head (see Fig. 28) to rest against the under side of the finger 110, and said head has two transverse slots to receive small bolts passing through said slots and through the body of the finger, by which means the arc of oscillation of said finger can be adjusted. The shaft 139 of the double crank carries at its lower end a bevel-pinion 143, that gears with a bevel-pinion 144, secured upon the shaft 53, by which motion is transmitted thereto.

The band-twisting cylinder has its rear end secured upon the shaft 58, said shaft extending only slightly beyond the point indicated by the line $e$ $e$ of Fig. 4, where it is flattened and transversely perforated to provide bearings for the inner ends of the shafts, Fig. 11, carrying revolving eccentric jaws to push the straw toward and into the twisting-rollers in the front end of the cylinder, within a head inclosed in the cylindrical box P$^9$, that is secured to the forward half of the skeleton frame 93. The rear half of the skeleton frame 93 carries on its forward side a sleeve 146, through which the shaft 58 passes loosely and rotates therein. Upon the sleeve 146 is secured the stationary gear 147, that projects forwardly of a hollow cam 148, secured to the side of the skeleton frame 93. On the sides of the stationary gear 147 are two pinions 149, adapted to travel around the gear 147, while meshing therewith. The pinions 149 are mounted upon the rear ends of shafts 150, having bearings in the rear plate 151 of the cylinder. The forward ends of the shafts 150 are carried by the circular forward plate 152, Figs. 9 and 19, of the cylinder, and said plates 151 and 152 are united by the segments of partly-tubular pockets 153, each pocket being used to receive one strand of the double-strand straw-band provided by the machine.

To grasp the wisp of straw held between the under side of the needle and the plate 97$^f$, as before described, and bring it within one of the pockets 153, there are pivoted along the edge of one of the segments constituting the walls of the pockets, a series of curved fingers 154, mounted upon a shaft 155 that extends the length of the cylinder, and said fingers are controlled by the stationary cam 148. For this purpose there is secured upon the rear end of the shafts 155 of each pocket a crank-arm 156, having on its outer end a roller adapted to travel against the inner face of the cam 148. To keep the pockets closed while the cylinder makes a suitable number of revolutions—for example, five revolutions—before it opens, (the gears 55, 56, and 57 have the proportions shown in the drawings,) a cam-switch 157 is located within the cam 148. Said switch is controlled by a cam 158, mounted upon the shaft 53 alongside of the gear 55. Within the groove of the cam 158 there is a roller mounted upon one end of a bell-crank lever 159, pivoted to the frame 93, and the other end of said lever is united by means of a connecting-rod 160, Fig. 14, with a crank-arm 161 upon the short pivoted shaft of the switch 157.

To advance the straw in the pockets toward the twisting head and rollers therein, revolving pairs of jaws 162 and 162$^a$ are placed within each pocket 153. Each jaw of each pair is mounted eccentrically upon a flat head 163, having a neck or boss, retained in a suitable bearing, forming a part of the metal of which the pockets are formed. Within said flat head and boss is secured a shaft 164, guided by a second bearing 165. Adjacent to said bearing is mounted upon the shaft 164, a bevel-gear 166, that meshes with a pinion 167, one-half of its diameter mounted upon the shaft 150. To rotate the inner jaw of each pair there is secured upon the shaft 164 a pinion 168, that meshes with a pinion 169 of the same size upon the shaft of the inner jaw 162$^a$, the inner end of said shaft being journaled into the shaft 58, close to its inner end. By this construction the straw is grasped, pushed forward about an inch, released while it is drawn by the twisting-rollers, and grasped again about an inch and a half in the rear of the point where it had been previously grasped, and the operation is continued as above stated.

To trim the straw at either end thereof after it leaves the under side of the needle, in case it had been pulled endwise by friction with the dividing-fingers 110, the end fingers 170, Fig. 4, of the series of fingers 154 are provided with a cutting-blade to operate in connection with a stationary blade 171, secured to each head of the cylinder. Each pair of twisting-rollers is carried in a slotted frame P, having a part of its outer periphery cylindrical. Its inner periphery is also cylindrical in part, but has two segmental portions P', as shown in Fig. 23, that are used as bearings for the journals of the twisting-rollers. The frame P has at one end a boss P$^2$, upon which is secured a pinion P$^3$ that meshes with a pinion P$^4$, mounted upon the front end of the shaft 150 and having preferably the same diameter as the pinion P$^3$. The boss P$^2$ is hollow and its central perforation P$^5$ is elliptical at its inner end and circular at its outer end and leads into a sheet-metal funnel P$^6$ that directs each single strand of the straw-band toward the clamping-rollers P$^7$. To give a rotary motion to the twisting-rollers $l$, each cylindrical frame P is loosely fitted into a sleeve $p$, carried by a larger sleeve $p'$, and each sleeve $p$ has its internal surface provided with a triple or quadruple thread (of great inclination, being about one inch pitch,) and the gear-wheel $p^9$, secured upon one end of each of the twisting-rollers, meshes with the internal screw-thread of the sleeve $p$ and thereby obtains its rotation. The outer end of the boss P$^2$ is also outwardly turned and shouldered at $p^7$ to form a journal that is loosely fitted into the cap-plate P$^8$ of the twisting-cylinder. The cap-plate is fastened to the forward plate 152 by bolts passing through the perforations $p^8$ in said cap-plate; but to prevent the frame P and the sleeve $p'$ from being jammed tightly between said parts P$^8$ and 152 the sleeve $p'$ has side lugs $p^2$ to bear against the cap-plate P$^8$. Although I have called the part $p$ a sleeve, the two sleeves $p$ are united at their inner end to the sleeve $p'$ by a disk $p^4$, having two large perforations, from the rim of which the rings $p$ project, and each of said rings contain one of the cylindrical frames P.

To render the twisting-rollers $l$ yielding to receive more or less straw between them, the journal at one end of each roller bears against a wire spring $p^5$, bent in the form of a hook, having its longest end driven in the segmental portion P' of the frame P and its shortest end bearing against the journal of the twisting-roller. The lower clamping-roller P$^7$ has rigid bearings, but the upper clamping-roller has its journals pressed upon by bearings retained in the bearing-supports $q$, and within said supports are placed the springs $q^2$, that press at one end upon the upper journal-bearing and have their upper end adjustably retained by screws $q^3$. The two clamping-rollers have gears at one end that mesh together. The shaft of the lower roller $P^7$ carries upon its extremity a bevel gear-wheel $q^4$, that meshes with a bevel-gear $q^5$ upon the shaft 53 and obtains its motion therefrom.

Having now fully described my invention, I claim—

1. In combination with the bottom elevating apron of a harvester, the top elevating apron at the butt-end, chain casings parallel with said elevating apron, chains within said casings, and rods uniting said chains, a triangular plate 12, a grooved bar 22 diagonally between the chain casings, cutting and carrying devices sliding upon the rods and controlled by said grooved bar, and a receptacle for the cut straws substantially as described.

2. In combination with the bottom elevating apron of a harvester, the top elevating apron at the butt-end, two chain casings parallel with said apron, chains within said casings and rods uniting said chains, teeth projecting from the links of the chain in the forward casing, a grooved bar 22 diagonally between the chain casings, cutting and grasping devices sliding upon the rods and controlled by said grooved bar, and a receptacle for the straws at the upper end of the apron substantially as described.

3. In combination with the bottom elevating apron of a harvester two chain casings parallel with said apron, chains within said casings, rods uniting said chains, teeth projecting from the links of the chain in the forward casing, a triangular plate between the bottoms of the casings, and a grooved bar 22, retained diagonally between the chain casings and carriers co-operating with said grooved bar substantially as described.

4. In combination with the bottom elevating apron of a harvester, two chain casings, parallel with said apron, chains within said casings and rods uniting said chains, a grooved bar retained diagonally between the chain casings, straw-pickers loosely mounted upon the rods uniting the chains and provided with means whereby they are guided by the grooved bar diagonally above the bottom elevating apron substantially as described.

5. In combination with the bottom elevating apron of a harvester, two parallel chain casings over said apron, chains within said casings and rods uniting said chains, a triangular plate retained between said casings, a grooved bar diagonally retained between the chain casings, and hinged straw-pickers loosely mounted upon the rods uniting the chains and constructed to be guided by the diagonally retained grooved bar substantially as described.

6. In combination with a straw-band making mechanism, two parallel chain casings, chains therein and rods uniting said chains, and straw-pickers mounted thereon to travel diagonally between the chain casings substantially as described.

7. In combination with a straw-band making mechanism and a bottom elevating apron of a harvester, a forward butt-elevating chain, and in the rear thereof, a grooved bar 24 divergent from the forward chain, a chain having rods 15 and straw-pickers mounted upon the latter whereby the straw-pickers are caused to travel diagonally upward substantially as described.

8. In combination with a straw-band making mechanism, a bottom elevating apron of a harvester and connected chain links having rods 15 and upon the latter straw pickers guided to travel diagonally over said apron, said straw-pickers consisting of two members hinged together, each member having a jaw and a blade on the side thereof substantially as described.

9. In combination with a straw-band making mechanism, a bottom elevating apron of a harvester, a front elevating chain provided with teeth, a rear chain parallel therewith, straw-pickers guided to travel diagonally between said chains, a pivoted lever controlling the delivery of cut grain to the straw-pickers, and means within reach of the driver to control said lever substantially as described.

10. In combination with a straw-band making mechanism, a bottom elevating apron of a harvester, an upper elevating apron, chains parallel with said aprons, straw-pickers guided to travel diagonally between said chains and around the upper and lower shafts of the upper apron, with rotary cutters mounted on the upper shaft substantially as described.

11. In combination with a straw-band making mechanism, a bottom elevating apron of a harvester, a triangular plate above said apron, chains carrying straw-pickers above said plate, and a grooved bar 22 to direct said pickers over one edge of said plate substantially as described.

12. In combination with a straw-band making mechanism and a bottom elevating apron of a harvester, a forward butt-elevating chain, a triangular plate under the grain-end elevating carrier, a grooved bar divergent from the butt-elevating chain, straw-pickers guided by said grooved bar, a horizontal shaft at the upper end of said bar and rotary fingers upon said shaft substantially as described.

13. In combination with a straw-band making mechanism, a forward butt-elevating chain, a grooved guide-bar divergent from the butt-elevating chain, straw-pickers guided by said bar, a horizontal shaft at the upper end of said bar, a triangular plate under the butt-elevating chain and under the grooved bar, rotary cutters on the horizontal shaft, and a stationary blade substantially as described.

14. In combination with straw-pickers, guided to elevate straw diagonally over the elevating apron of a harvester, a straw-band making mechanism and its hopper, the curved hopper-throat and straw-elevating fingers therein substantially as described.

15. In combination with a harvester straw-band making mechanism and its hopper, having a reciprocating slotted bottom a stationary needle across said bottom substantially as described.

16. In combination with a straw-band making mechanism, the reciprocating slotted hopper-bottom thereof and its yieldingly supported straw pushing-plate 97$^a$ substantially as described.

17. In combination with a straw-band making mechanism the reciprocating slotted hopper-bottom thereof, and under said bottom, the stationary needle having its point beveled under and vertically slotted, the vertical lip 97$^e$ movable with the hopper-bottom and adapted to enter in the vertical slot of the needle and its extension 97$^f$ inclined similarly as the beveled under side of the needle substantially as described.

18. In combination with a straw-band making mechanism, the reciprocating slotted-bottom thereof, carrying the lip 97$^e$, having a longitudinally slotted extension 97$^f$, and the middle frame having a lug 100$^a$, to enter said slotted extension substantially as described.

19. In combination with a straw-band making cylinder and its inclosing frame, the stationary shelf 109, adjustably secured to said frame substantially as described.

20. In combination with a straw-band making cylinder, and its inclosing middle frame, the stationary needle, the shelf 109, adjustably secured to said frame and a hooked arm 108, yieldingly supported and vertically movable substantially as described.

21. In combination with a straw-band making cylinder and its inclosing middle frame, the shelf 109 secured to said frame, a hooked arm 108, vertically movable on the side of said frame and having a lug on the side thereof, a link pivoted to said arm and bearing under said lug, and a spring pressing under said link, substantially as described.

22. In combination with a straw-band making cylinder and a needle above it, a stationary bar under said needle and parallel with said cylinder, two fingers pivoted at one end and slotted longitudinally for the passage of the pivot bolt and having pendent lugs straddling the stationary bar substantially as described.

23. In combination with a straw-band making cylinder, and a needle above it, a stationary bar above said cylinder, two fingers pivoted at one end and having the opposite end adapted to be reciprocated above the cylinder, with a double crank between said fingers, and rods uniting the fingers to each crank-pin of said crank substantially as described.

24. In combination with a straw-band making cylinder, two fingers pivoted at one end, and having the opposite end adapted to be reciprocated above the cylinder, with a double crank between said fingers, rods uniting the fingers to the crank, and pins adjustably secured to the fingers to connect said rods to the latter substantially as described.

25. In combination with a straw-band making cylinder, two fingers pivoted at one end, and means as described to reciprocate the opposite end, with auxiliary dividing arms pivoted to the fingers, a spring to keep them normally closed together, and a stationary bar having projections for engagement with projections pendent from the dividing arms substantially as described.

26. In combination with the two heads of a straw-band making cylinder and the walls of the semi-cylindrical pockets connecting said heads, a pair of rotary jaws within each pocket, whereby the straw placed therein, is advanced lengthwise of said pockets substantially as described.

27. In combination with the two heads of a straw-band making cylinder and the walls of longitudinal pockets connecting said heads, a pair of rotary jaws within each pocket, each jaw being mounted eccentrically on the head of a shaft journaled in the walls of said pockets substantially as described.

28. In combination with two heads of a straw-band making cylinder, and the walls of longitudinal pockets connecting said heads, a pair of rotary jaws within each pocket, each jaw being mounted eccentrically on the head of a shaft journaled to the walls of said pockets, gears uniting said shafts in pairs, and also to shaft 150, parallel with the axis of the cylinder, a stationary gear encircling the shaft of the cylinder, and pinions meshing with the stationary gear substantially as described.

29. In combination with the two heads of a straw-band making cylinder, and the walls of longitudinal pockets connecting said heads, shafts 155, parallel with the cylinder, fingers and a crank arm mounted upon each of said shafts, a stationary cam to receive rollers upon the crank arms, and a movable cam-switch in said cam, substantially as described.

30. In combination with two heads of a straw-band making cylinder, having blades secured thereto, and the walls of longitudinal pockets connecting said heads, a pair of rotary jaws within each pocket, pivoted fingers alongside of each pocket, and blades secured to the end-fingers thereof substantially as described.

31. In combination with the two heads of a straw-band making cylinder, and the walls of longitudinal pockets between said heads, and shafts 150 alongside of said pockets, the gears P$^4$, mounted upon said shafts, with the frames P carrying rollers, and gears P$^3$ on said frames to mesh with the revoluble gears P$^4$ substantially as described.

32. In combination with the two heads of a straw-band making cylinder having longitudinal pockets between said heads, and shafts 150, alongside of said pockets, the gears P$^4$, mounted upon said shafts, the disk $p^4$ having two rings internally screw threaded, the frame P, the twisting rollers carried thereby, and the cog wheel upon one end of each of said twisting rollers substantially as described.

33. In combination with the two heads of a straw-band making cylinder, having longitudinal pockets between said heads and shafts 150 alongside of said pockets, the gears $P^4$ mounted upon said shafts the frame P having a rectangular recess at one end and a conical opening at the other, and twisting rollers in said rectangular recess substantially as described.

34. In combination with the two heads of a straw-band making cylinder, having longitudinal pockets between said heads, and shafts 150 alongside of said pockets, the gears $P^4$ mounted upon said shafts, the two cylindrical frames P, the twisting rollers therein, the spring bearing $p^5$ in each of said frames substantially as described.

35. In combination with the two heads of a straw-band making cylinder, having longitudinal pockets between said heads and shafts 150, alongside of said pockets, the gears $P^4$, mounted upon said shafts, the revolving head, and two conical funnels surrounding the opening leading from the twisting rollers substantially as described.

36. In combination with the shaft of a straw-band making cylinder, a cylindrical casing having internal ratchet teeth and a bevel pinion loosely mounted upon said shaft, a disk and its ratcheted boss secured upon said shaft, a pawl-carrying disk, a pawl pivoted on the latter and having a finger projecting beyond the periphery of the disk, and means to control said pawl-finger automatically substantially as described.

37. In combination with the shaft of a straw-band making cylinder, a disk and its ratcheted boss secured upon said shaft, a disk carrying a double pointed pawl pivoted thereto and its stop arm 70, a cylindrical casing having internal ratchet teeth and a bevel-pinion loosely mounted upon the shaft of the cylinder, a counter shaft consisting of two parts united by a torsional spring, a bevel pinion secured upon one of said parts, and means to rotate the second part of said counter shaft substantially as described.

In testimony whereof I affix my signature in presence of two witnesses.

HOSMER TUTTLE.

Witnesses:
E. E. MASSON,
A. B. DEGGES.